United States Patent
Lusky et al.

(10) Patent No.: US 8,250,285 B2
(45) Date of Patent: Aug. 21, 2012

(54) NON-VOLATILE DUAL MEMORY DIE FOR DATA STORAGE DEVICES

(75) Inventors: Eli Lusky, Tel-Aviv (IL); Yoav Yogev, Maskeret-Batia (IL)

(73) Assignee: Infinte Mormories Ltd., Rosh Ha'Ayin (IL)

( * ) Notice: Subject to any disclaimer, the term of this patent is extended or adjusted under 35 U.S.C. 154(b) by 591 days.

(21) Appl. No.: 12/207,946

(22) Filed: Sep. 10, 2008

(65) Prior Publication Data
US 2010/0061154 A1     Mar. 11, 2010

(51) Int. Cl.
*G06F 12/00* (2006.01)
(52) U.S. Cl. .................. 711/103; 711/111; 711/E12.008
(58) Field of Classification Search .................. 711/103, 711/111, E12.008
See application file for complete search history.

(56) References Cited

U.S. PATENT DOCUMENTS

| 2007/0103991 A1* | 5/2007 | Yeh et al. ................. 365/185.29 |
| 2007/0233933 A1* | 10/2007 | Wang et al. .................... 711/100 |

* cited by examiner

*Primary Examiner* — Yong Choe
(74) *Attorney, Agent, or Firm* — Vladimir Sherman; Professional Patent Solutions (57) ABSTRACT

OTP Data storage die and device consisting of novel OTP (One-Time-Programming) NVM (Non-Volatile-Memory) die is disclosed. The OTP Data storage device can be used in typical host applications with standard interface protocols and file system. The novel OTP memory is a dual memory with both RAM (random access memory) capability and NAND Flash like interface. These features enable to achieve efficient management capabilities and dense array for the OTP data storage device.

20 Claims, 7 Drawing Sheets

Fig 1 (prior art)

Host's file system

MBR
- Located in logic address "0" (boot from this location)
- Includes information regarding FAT and folders information

Partition table
- container for additional partitions called logical drives

FAT
- Consist of the addresses of all memory blocks
- Each entry is composed of 8 – 64 bits
- Located in the memory array, governed by the HOST

Folders information – Root directory
- Location of root directory, 512 rows, each with description of the files/folders existing in the disk
- File/folder information convention: name, size, first block location and type (file/folder)

Fig 2 (prior art)

HOST's sequential read operations using FAT16 based operating system

1. Read MBR

2. Read partition table if exist

3. Generate FAT copy:
   a. Validate FAT 16 structure
   b. Generate FAT copy in the host's memory 4. Read Root directory (in parallel to step 3)
   a. Search the root directory for the requested file.
   b. From root directory, obtain the location in the FAT of the first block which is associated with the requested file.

5. Read FAT:
   a. Fetch from FAT the logical location of block #1 of the requested file
   b. Read the next entry in the FAT:
      - The next entry can indicate the physical location of Block #2 of the requested file; or
      - The next entry can indicate the End Of the requested File (EOF).
   c. If the EOF was not reached; read the next entry in the FAT (repeat 3b).
   d. If the EOF was reached – stop.

Log Entries

Fig 5

Log Entry (k)

| Index of FAT entry m (16 bits) | Content of entry m (next FAT entry) (16 bits) |
|---|---|

NON-VOLATILE DUAL MEMORY DIE FOR DATA STORAGE DEVICES

FIELD OF THE INVENTION

The present invention relates to a memory devices. In particularly, the present invention relates to a dual region memory die.

BACKGROUND OF THE INVENTION

Figure 1:
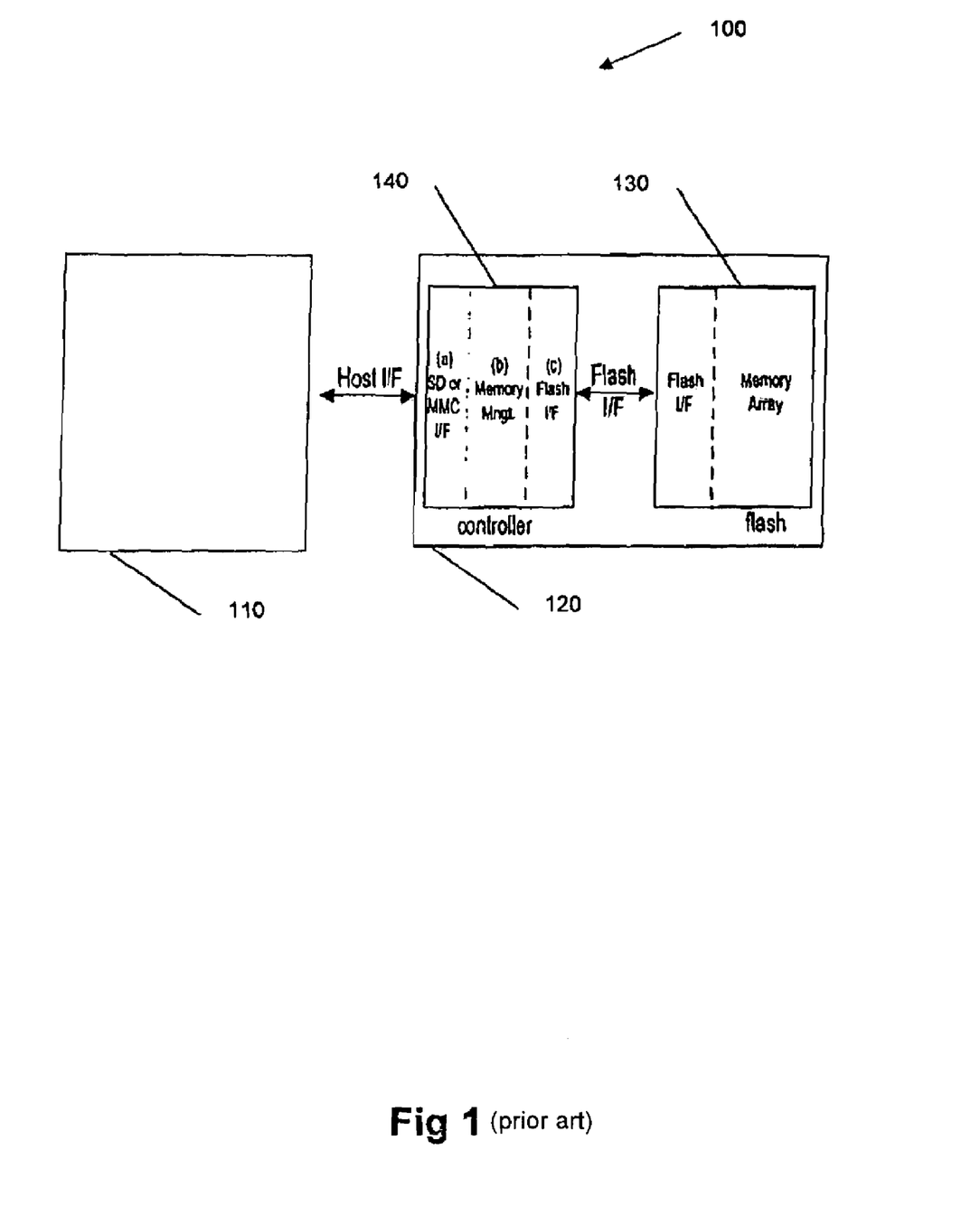
FIG. 1 depicts a system comprising a host and a data storage device as known in the art.

FIG. 1 depicts a system 100 comprising a host 110 and a Non-Volatile-Memory (NVM) data storage device 120 as known in the art. Data storage devices such as data cards, USB sticks or other storage devices usually integrate NVM data flash memory 130 and a controller 140 into a single package 120.

When connected to a host device 110, for example a personal or a laptop computer, communication between the data storage card and the host device commence. The controller 140 within the data storage device 120 manages data transfer between the host and the flash memory 130 by serving as a gateway in both data transfer directions by writing to and reading from flash memory 130. The data consists of user data and management data and files. Management files comprising addresses updates and files naming. The operating system that enables the communication between the host and the data storage device is DOS (Disk Operating System) based.

Figure 2:
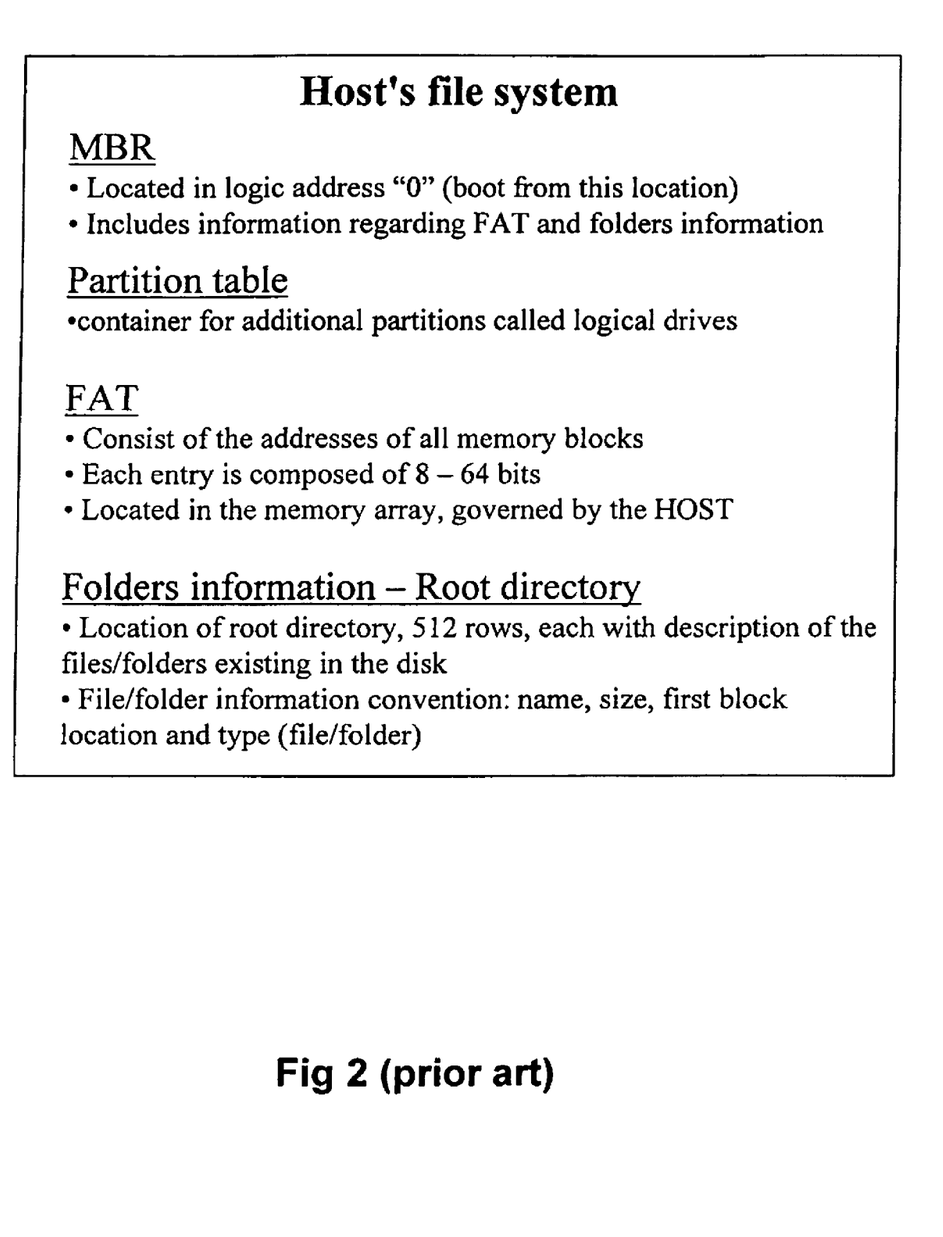
FIG. 2 schematically depicts the relevant elements of the host's file system as known in the art.

FIG. 2 schematically depicts the relevant elements of the host's file system as known in the art. It consists of Master Boot Record (MBR); Partition Boot Record (PBR); Folders information; and File Allocation Table (FAT). The MBR consist information regarding the data storage device including FAT location and size; and root directory location. Its location is always logic address 0 which is translated by the controller to a physical address in the memory die. Root directory is with constant table size, consisting 512 rows, each with a description of the files or folders existing in the disk. It includes name, size, first block location and type of file (file or directory).

FAT is located in the memory array 130 but is governed by the host 110. It is a computer file system architecture originally developed by Bill Gates and Marc McDonald. It is the primary file system for various operating systems including DR-DOS, OpenDOS, freeDOS, MS-DOS, OS/2(v1.1), and Microsoft Windows (up to Windows Me). For floppy disks (FAT12 and FAT16 without long filename support) FAT has been standardized as ECMA-107 and ISO/IEC 9293. The use of long filenames with FAT is patented in part. The FAT file system is supported by virtually all existing operating systems for personal computers. This makes it an ideal format for solid-state memory cards and a convenient way to share data between operating systems.

The FAT comprises the addresses of all blocks in the memory disk. FAT record may be composed of 16 bits, FAT 16 (FAT12 and FAT32 are also used), hence indicating on a maximum $2^{16}$ address locations. Assuming a disk capacity is <2 GB (16 Gb), each address is with a maximal $2^{17}$ (64 KB) chunk size. FAT is backed-up by having two copies at all times, FAT1 and FAT2. The disk size dedicated for FAT in case of 2 GB disk is $2 \times 16 \times 2^{16}$=256 KB.

Figure 3:
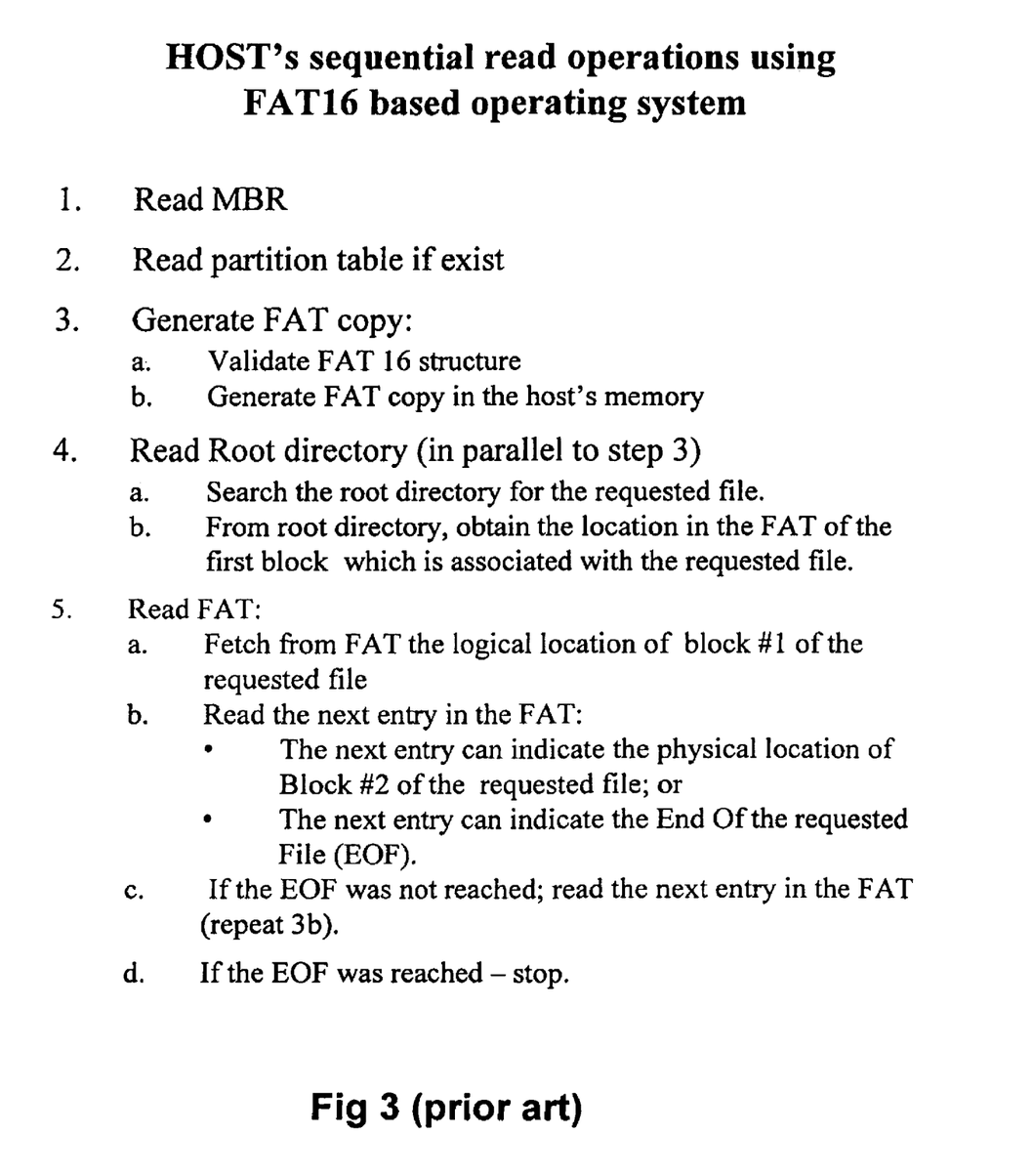
FIG. 3 schematically depicts an example of the sequence of events that takes place when read operation commence according to the methods of the art.

FIG. 3 schematically depicts an example of the sequence of events that takes place when read operation commence according to prior art. Upon power-up, and possibly connecting the memory card to the host or per user request to access the memory card, the MBR is addressed, the host generates a copy of the FAT in its memory and approaches to the root directory where information regarding the files is extracted (either located in the root folder itself, or more typically in a subfolder associated with the folder which appears in the root directory). Once the location of the first block of the requested file is identified, the rest of the blocks are sequentially pointed by the FAT. The FAT is owned by the controller and it uses logic addresses—the translation of the logic addresses to physical addresses is done by the controller that allocates both the data and the FAT in specific physical locations within the memory array.

The block size is typically determined by the host—with a minimum size such that the maximum number of blocks in the disk will not exceed $2^{16}$=65,536 (assuming FAT16 is used).

The following section schematically depicts the association of FAT entries with physical blocks within the array as used by methods of the art. When the host 110 initiate the read sequence (addressing the MBR, root directory, etc . . . ), it also initiate routines to be executed by the controller 140, in which the required physical blocks are read using a logical address to physical address mapping table that exists in the controller (there is limited capacity of memory in the controller used for such purposes). Using adequate protocol (SD/MMC/USB etc . . . ), the controller enables instructions and data transfer between the host 110 and the memory die 130. In typical case 8 entries in the FAT may be mapped to single Erase Sector (ES)—a specific physical location in the memory array. Typically, for each Physical Sector (PS) in the memory array there is at least single spare ES that is left empty The following section describes the process of user data writing into a flash as used by methods of the art. During write operation where for example a new picture or a file with size of for example 1 MB is to be written into the memory array 130 by host 110, the sequence of events is similar to the process described previously. The main difference is that the relevant files, root directory, FAT and data files are modified. Whenever new data is loaded, a new file entry is generated in one of the subfolders of the root directory. Subsequently, the FAT is updated as well by looking for free entries in the host and allocating them for the picture or file to be recorded on the memory die where blocks of typically 4 KB size may be pointed by the FAT entries (256 free entries for 1 MB file). Write command is sent to the controller instructing it to write the user data, followed by command to the controller to update the FAT entries as well. The update corresponds to re-mapping of the logical to physical address table which is carried out by the controller.

FAT is typically updated by regenerating it in different physical locations according to the new mapping table. The previous physical location where the old FAT was stored in the memory 130 is typically erased and serves as part of spare ES. In standard data cards, when the card is physically full, (that is: all its memory has already been used before, but logically has free memory used data that is designated as "deleted") a new picture or a file is loaded by first deleting written erase sectors containing deleted pictures or files.

As implied from the above, the logical addresses that are pointed out in the FAT and root directory are typically linked to various physical locations which are changed in each data transfer. Yet, logical addresses of management files may be linked to the same physical location in more than one data transfer with a frequency that depends on various applications such as die size, controller's algorithm, etc. As a result, even for a single program operation of the data storage device, the associated management blocks (root directory, FAT, etc.) may endure larger number of program and erase cycles. For example, to completely fill once a data card of 128 MB such as camera data card, more than 40 pictures can be taken at different instances with a single programming sequence per each picture. The associated physical to logic mapping operation typically changes throughout these 40 sequences, yet, the same mapping of the management blocks may repeat itself.

To conclude, in prior art, standard data storage device must support a minimum of several program and erase cycles in order to enable the repeatable mapping between physical to logical addresses even when the data storage device is used for One Time Program (OTP) application. Flash dies are typically being specified by the maximum designated number of program and erase cycles which range between 5 and 100,000 cycles. Note that in data flash memories, program operation is carried out in page mode (0.5-4 KB) while erase operation is carried out in Erase Sector (ES) of 32-128 KB size. The controller manages the data in the flash using ES chunks. In typical operation mode, while new data is loaded, the FAT and folders data are modified and actually written to another location in the memory region before the old ones are erased. The "old" location is not necessarily deleted (erased) immediately. It is typical that spare erase sectors are available for the management operations that are carried out by the controller.

While OTP data card may consist data flash memory with multiple program and erase cycling capability, other technologies with program only (OTP) capability may be used to form OTP data card as well. The advantage of the OTP memory over flash memory is the significant reduced cost per bit. This is possible because manufacturing cost of a given memory density using OTP technology is~×2 lower than standard data flash technology.

Among others, it is possible to use as an OTP technology the 4 bits per cell NROM technology which reduce processing cost significantly compared to the state of the art, NAND type, data flash memory which is based on 2 bit per cell Multi-Level-Cell (MLC) data flash or 1 bit per cell Single-Level-Cell (SLC) data flash. This advantage is furthermore emphasized as when considering low density memory dies (<2 Gb) for data storage devices, the most appealing approach using NAND data flash at 90 nm technology node and below is SLC. SLC NAND is superior over MLC NAND under the above mentioned circumstances as the design complexity associated with the periphery circuitry is much simpler and cost effective in terms of die size.

OTP memory based data storage cards may be used either in a single content loading sequence (i.e., the entire card capacity or part of it is loaded only once) or alternatively, in a multiple loading sequences where the management portion of the die is significantly extended to avoid remapping of the management files to the same physical addresses. For example, typical FAT area requires ~256 KB memory size in standard data flash while in OTP memory it may consume the same memory size per each data transfer sequence, ~10 MB assuming 40 pictures are taken at different sequences (40× 256 KB). In typical data storage device with a 128 MB memory die capacity, it consumes ~10% of the of the data card capacity.

U.S. Pat. No. 5,392,427 to Barrett, et al. entitled "System for updating data stored on a flash-erasable, programmable, read-only memory (FEPROM) based upon predetermined bit value of indicating pointers"; discloses a method and system for updating data stored on a computer storage device. The data is contained in records or entries. Each record or entry has a primary pointer and an indicator. The indicator initially has each bit set to a predefined bit value. When data is to be updated (and thus, the record or entry containing the data is to be superseded), at least one bit of the indicator is changed from the predefined bit value to another bit value to point to the new record or entry and to indicate that the data in the new record or entry is an update of the data in the superseded record or entry. This method and system are especially suitable to be used in a write-once computer storage device.

U.S. Pat. No. 5,568,634 to Gordons; entitled "Method of writing in a non-volatile memory, notably in a memory card employing memory allocation strategies on size and occupancy basis"; discloses a system for the management of non-volatile memories, wherein, to avoid losses of information during writing, the critical writing sequences are locked. A back-up information element is stored before the performance of the critical section. The lock is constituted by the bits of the allocation table that designate the location of the saved back-up information. The lock is erased at the end of a normal writing sequence. If there is an abnormal interruption of a writing operation during the critical section, then the lock remains locked. This is detected when the power is turned on again, and the writing is resumed utilizing the saved information elements. The lock and the saved information elements are in a variable zone of the memory, thus preventing memory fatigue in the event of intensive use. Furthermore, the management of the memory is original in that two different memory allocation strategies are used to enable the detection, by the allocation table, of the presence of an information element whose location is not known.

U.S. Pat. No. 5,630,093 to Holzhammer, et al. entitled "Disk emulation for a non-volatile semiconductor memory utilizing a mapping table"; discloses a non-volatile semiconductor memory that is erased in blocks. The non-volatile semiconductor memory includes an active block for storing first data and a reserve block for storing second data. The second data is a copy of the first data. The copy is made during a clean-up operation prior to erasure of the active block. The non-volatile semiconductor memory also includes a mapping table for mapping a logical address of an allocation unit to a physical address of a sector within the non-volatile semiconductor memory.

U.S. Pat. No. 6,256,642 to Krueger, et al. entitled "Method and system for file system management using a flash-erasable, programmable, read-only memory"; discloses a method and system for memory management of a block-erasable Flash-EPROM. The system comprises a FEPROM manager and a file system. The FEPROM manager manages memory allocation and de-allocation of the FEPROM. The file system is a hierarchical directory system and uses the FEPROM manager to allocate and de-allocate memory. In a preferred embodiment, the FEPROM manager of the present invention provides for allocation of free space, de-allocation of allocated space, and reclamation of de-allocated space in a block-erasable FEPROM. Each block of the FEPROM contains a block allocation structure, data regions, and free space. The block allocation structure contains an allocation array which describes the allocation of the data region.

United States Patent Application 20030204659; to Huang, Kan-Chuan; entitled "Digital storage media with one-time programmable read only memory"; discloses a digital storage media connects to an electronic device for storing digital data transmitted from the electronic device. The digital storage media includes an interface control circuit for controlling interface between the electronic device and the digital storage media, a first memory for storing program codes of the digital storage media, and a second memory for storing digital data transmitted from the electronic device. The digital storage media also includes a memory control circuit electrically connected between the interface control circuit and the second memory for storing the digital data transmitted from the interface control circuit into the second memory, and a processor for controlling operations of the digital storage media. For storing the digital data transmitted from the electronic device, the second memory has metal-insulator-semiconductor transistors.

United States Patent Application 20070208908; to Moore; Christopher S.; et al.; entitled "Method and apparatus for using a one-time or few-time programmable memory with a host device designed for erasable/rewriteable memory"; discloses a method that can be used to enable one-time or few-time programmable memories to work with existing consumer electronic devices (such as those that work with flash erasable, non-volatile memory) without requiring a firmware upgrade, thereby providing backwards compatibility while minimizing user impact. As such, these embodiments are a viable way to bridge one-time or few-time programmable memories with existing consumer electronic devices that have flash card slots. These embodiments also allow future consumer electronic devices to be designed without updating firmware to include a file system customized for a one-time or few-time programmable memory.

U.S. Pat. No. 6,836,834; to Schulze, et al.; entitled "Memory card having one-time programmable memory"; discloses a memory card having a one-time programmable memory which stores a plurality of storage allocation tables and which is compatible with a host device. Details of memory card construction and operation can be found there.

NROM cells are described in many patents including U.S. Pat. No. 6,649,972 where NROM technology employs a virtual-ground array architecture with a dense crisscrossing of word lines and bit lines.

U.S. Pat. No. 7,4059,69 refers to standard Single-Level Cell (SLC) Nitride Read Only Memory (NROM) and Multi-Level Cell (MLC) NROM. The patent entitled "Non-volatile memory cell and non-volatile memory devices"; to Eitan, Boaz; discloses a non-volatile electrically erasable programmable read only memory (EEPROM) capable of storing two bit of information having a nonconducting charge trapping dielectric, such as silicon nitride, sandwiched between two silicon dioxide layers acting as electrical insulators is disclosed. The invention includes a method of programming, reading and erasing the two bit EEPROM device.

United States Patent Application 20060084219; to Lusky.; et al.; entitled "Advanced NROM structure and method of fabrication"; discloses a method to enable manufacturing the dual memory NROM memory die.

SUMMARY OF THE INVENTION

The present invention relates to an apparatus, system and method for managing files in One-Time-Programming (OTP) Non-Volatile-Memory (NVM) based data storage devices One aspect of the current invention relates to the structure and method to enable compatibility of OTP based data storage device with standard host applications without the die size penalty associated with the extended management region. According to an aspect of the current invention, the memory die features a dual memory characteristic, comprising two different areas: data region and code region with Random Access Memory (RAM)) capability:

Data region area is used for the host data storage
  Code region area is used for management purpose; store and handle management related information According to an exemplary embodiment of the current invention, a non-volatile memory die is provided comprising: a code region and a data region, wherein memory capacity of said data region is larger than memory capacity of said code region, and said a code region access is finer than said data region access, and said code and data regions are formed using same cell structure on the same die.

The above characteristics feature a significant advantage over prior art as it enables improved efficiency when handling management data by saving die area which is needed for data management purposes. In the proposed invention, thanks to the availability of the code region where even a single bit can be accessed rather than a minimum of 512-4K bytes in standard OTP memory for data cards, the consumed management area may be as small as ~256 KB. The devices and methods according to embodiments of the current invention may enable compatibility of OTP memory with standard flash memory without the die size penalty that is associated with extended management region in prior art OTP memories.

To realize the dual memory concept various technologies may be utilized, for example NROM technology. According to embodiments of the current invention the entire memory, including both code and data zones may be manufactured using the same technology and same cell structure on the same die. NROM comprising: Oxide-Nitride-Oxide (ONO) stack dielectric used as charge trapping domain; a symmetric array consisting of buried bit-lines and word-lines perpendicular to each other; and a channel hot electron injection programming.

It is provided in accordance with a preferred embodiment of the present invention a non-volatile memory die comprising:
  a code region having a first memory capacity and a code region access resolution; and
  a data region having a second memory capacity and a data region access resolution;
  wherein said second memory capacity is larger than said first memory capacity, and wherein said code region access resolution is finer than said data region access resolution and wherein the code and data regions are formed using same cell structure on the die.

Furthermore and in accordance with another preferred embodiment of the present invention, the code and data regions are capable of being programmed once.

Furthermore and in accordance with another preferred embodiment of the present invention, said cell structure is NROM structure. Furthermore and in accordance with another preferred embodiment of the present invention, said NROM cell comprises
  Oxide-Nitride-Oxide (ONO) stack dielectric used as charge trapping domain;
  a symmetric array consisting of buried bit-lines and word-lines perpendicular to each other; and
  a channel hot electron injection programming.

Furthermore and in accordance with another preferred embodiment of the present invention, NROM cell density in said code region comprises 1 bit per cell.

Furthermore and in accordance with another preferred embodiment of the present invention, NROM cell density in said code region comprises 2 bit per cell.

Furthermore and in accordance with another preferred embodiment of the present invention, NROM cell density in said data region comprising at least 2 bit per cell.

Furthermore and in accordance with another preferred embodiment of the present invention, NROM cell density in said data region comprising at least 4 bit per cell.

Furthermore and in accordance with another preferred embodiment of the present invention, one command minimal data size accessible in said code region is up to 64 bits.

Furthermore and in accordance with another preferred embodiment of the present invention, one command minimal data size accessible in said code region is up to 16 bits.

Furthermore and in accordance with another preferred embodiment of the present invention, one command minimal data size accessible in said code region is up to 8 bits.

Furthermore and in accordance with another preferred embodiment of the present invention, one command minimal data size accessible in said code region is 1 bit.

Furthermore and in accordance with another preferred embodiment of the present invention, minimal data size accessible in said data region in one command is at least 512 bytes.

Furthermore and in accordance with another preferred embodiment of the present invention, minimal capacity of said first memory is no more than 1% of said second memory capacity.

Furthermore and in accordance with another preferred embodiment of the present invention, said first memory capacity is no more than 256K byte and said second memory capacity is at least 64M byte (assuming chunk size is 1K byte using FAT 16).

Furthermore and in accordance with another preferred embodiment of the present invention, said first memory capacity is no more than 256K byte and said second memory capacity is no more than 2 G byte (assuming chunk size is 32K byte using FAT 16).

Furthermore and in accordance with another preferred embodiment of the present invention, said code region is capable of being programmed and erased and said data region is capable of being programmed only once.

Furthermore and in accordance with another preferred embodiment of the present invention, the die is incorporated within a data storage device that comprises a controller interfacing between a host and the non-volatile memory die.

Furthermore and in accordance with another preferred embodiment of the present invention, said controller and the non-volatile memory die are processed on different dies.

In addition and in accordance with another preferred embodiment of the present invention, said controller and the non-volatile memory die are processed on the same die.

The devices and methods according to embodiments of the current invention may be used in applications where data need to be written once, possibly in stages and in applications such wherein memory space rarely or never needs to be re-used by erasing and re-writing new data over already written memory space. Such applications may be back-up applications where data is logged to reflect the timeline of the situation. Medical data records, legal data, criminal records and financial transaction records are examples for cases where data should not be removed—only new record be added.

With large enough capacity, music players such as MP3 players may use the invention, and the user may add more music and rarely if at all removes old music. Similarly, games and other software may be purchased and installed on devices according to the current invention or alternatively installed on the end user computer or remain mobile to be used when inserted into the user's computer. In digital cameras and other recording devices, the current invention may be used as "digital film" capturing and retaining the recorded images or data—in contrast to current flash memory card that may be erased due to user miss-use.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention relates to an apparatus, system and method for managing files in One-Time-Programming (OTP) Non-Volatile-Memory (NVM) based data storage device.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale. For clarity, non-essential elements were omitted from some of the drawings.

One aspect of the current invention relates to the structure and method to enable compatibility of One Time Programming (OTP), Non-Volatile Memory (NVM) based data storage device with standard host applications without the die area penalty which is consumed for management purposes. In contrast to prior art devices which consists of data flash with erase functionality, the OTP NVM based data storage device is capable of mere program operation where data can be transferred to the data storage device in a single or a multiple sequences until the memory capacity is full. Erase operation of the entire memory array or single section of it is not possible. Yet, logical erase is possible by remapping the same logical address to a new physical location.

Figure 4:
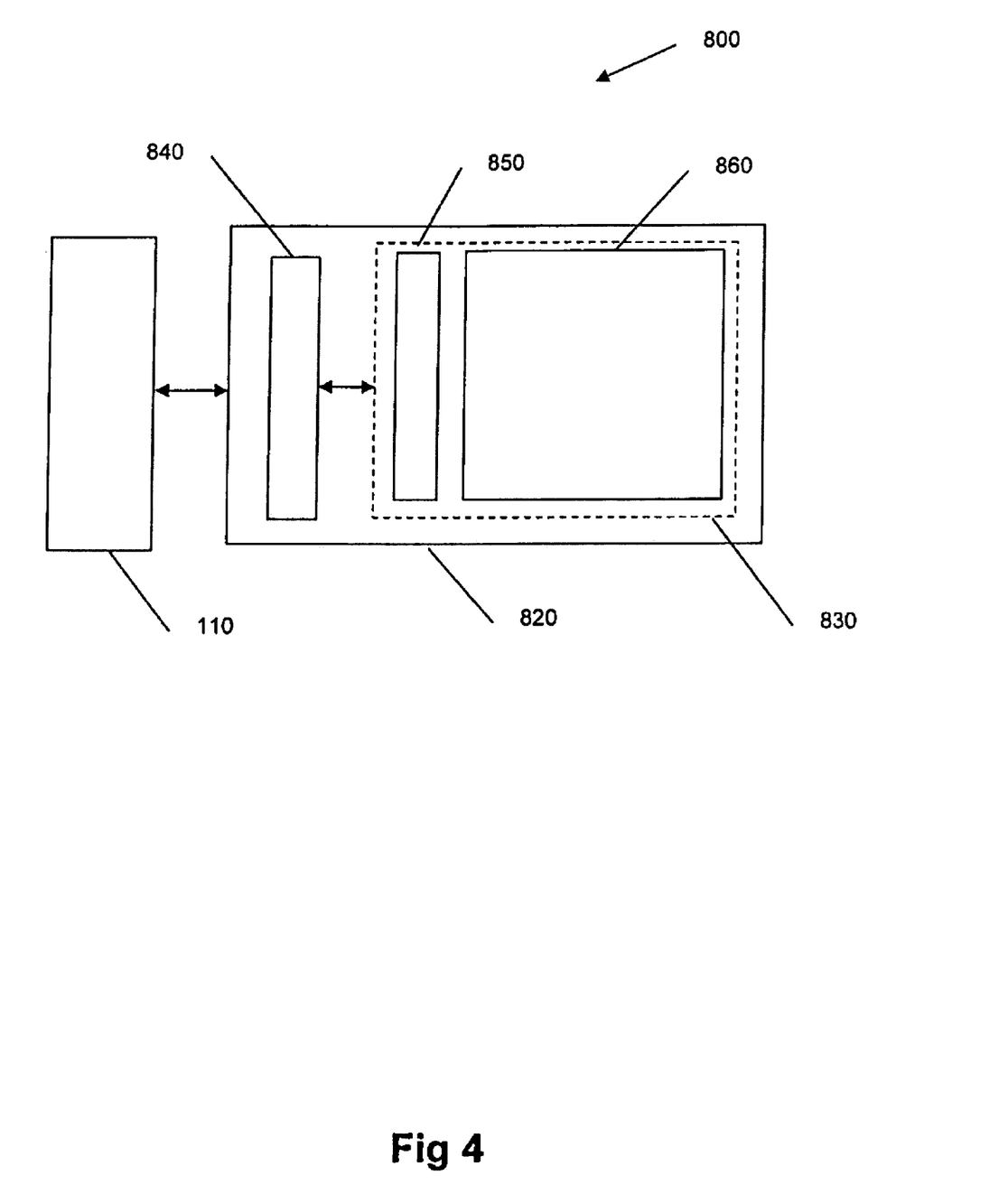
FIG. 4 schematically depicts a dual function flash memory comprising management memory and user data memory according to an exemplary embodiment of the current invention.

According to one aspect of the current invention, the memory die comprises two different areas: data and code regions. FIG. 4 depicts a system 800 comprising a host 110 connected to a data storage device 820 according to an exemplary embodiment of the current invention. Data storage device 820 comprises a dual function OTP memory 830; and a controller 840 in a single package. According to an exemplary embodiment of the current invention the memory die 830 comprises of two dedicated different areas: User data memory section 860 and management code memory section 850. Preferably, data region 860 and code region 850 are made with same memory cells technology. Thus, the same sensing and driving circuits may be used for writing to and reading from both data region 860 and code region 850. However, optionally, data region 860 and code region 850 uses different architecture and logic arrangement to allow smaller blocks in code region 850 compared to data region 860.

User data memory section 860 is data area and is used for the user data storage. Information such as data files, music files or pictures are stored in this section.

To enable random access capability in code region with 1 bit or byte accessibility compared to 0.5-4 K byte accessibility in data region, NROM technology can be utilized. NROM technology incorporates virtual ground array architecture and enables both RAM (Random Access Memory) capability for code application and high density 4 bits per cell approach for data applications.

The code area may be for example with shorter word lines in code region 850 to allow faster reading and writing times due to lower capacitance of these lines. Additionally, shorter address used to specify cells in code region 850 may allow faster reading and writing times. Additionally or alternatively, sensing and/or driving parameters may be differently set to optimize writing to and reading from code region 850 and data region 860. Alternatively; different sensing and/or driving circuits may be used for the different memory regions.

Management information such as MBR, PBR, root directory and FAT are stored in code area 850. According to an exemplary embodiment of the invention, code area 850 is preferably formed in dedicated mini-array within the die with memory size of 32K-256K byte where the capacity of user data section 860 may be 64M-2 G byte or more.

According to an exemplary embodiment of the invention, minimal update chunk within the code area 850 is single byte or single bit while the minimal updated region within the data region 860 is page size of 512-8K bytes According to an exemplary embodiment of the invention, cell's structure of code region 850 and data region 860 is identical. According to this exemplary embodiment of the invention, cell's structure is preferably NROM cell, wherein:

One or two bits per cell may be stored in code region 850 for improved reliability where Single Level Cell (SLC) methods are used; while Four bits per cell may be stored in the data region 860 where Multi Level Cell (MLC) methods are used.

According to another exemplary embodiment of the invention, code region 850 may be made to allow program and erase operations in code region 850 without the need for standard erase circuitry. In code area, the generated voltage during program operation may be used with minor modification to erase the data content. While optimal erase operation in NROM cells is achieved by applying negative voltage to the word-line (transistor's gate) and positive voltage to the bit-line (transistor's Source or Drain), grounding the word-line and applying only the positive voltage to the bit-line results in erase operation of all the cells along the bit-line. The main difference between such erase operation and optimal operation is the pulse length in both schemes; ~1 millisecond-1 sec vs. ~100 microsecond, respectively. Such a penalty in the erase operation may be acceptable only for the management area which is relatively small.

Figure 5:
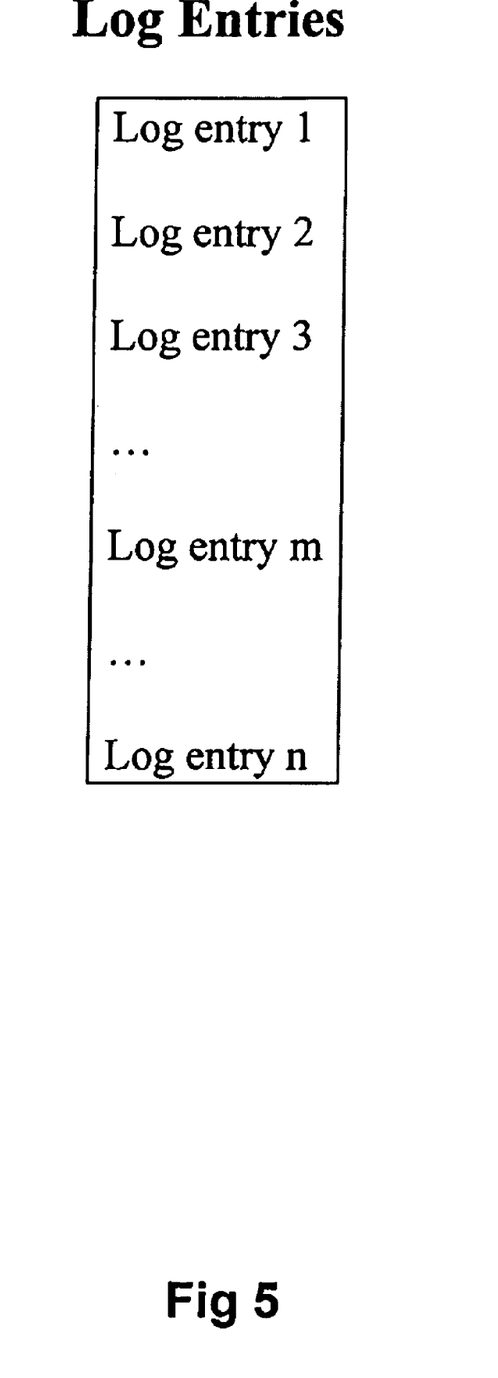
FIG. 5 schematically depicts the structure of virtual file system file according to an exemplary embodiment of the current invention.

Based on the above proposed structure, a method is hence proposed where the controller's firmware is adjusted to handle both the user data and management data:

1) Identify the format method used by the host's operating system.
2) Identify and differentiate the management from data files.
3) Realize efficient management method:

The excessive consumption of die size for management purposes in OTP memories is avoided by adopting a novel approach where in each data transfer sequence from the host to the memory die, only the changes in the management files are updated. In each update, log entry is written to provide information regarding the clusters which were recently updated (FIG. 5). The content of these log entries is the index which indicates on the FAT entry which is updated and the new content of this entry. In other words, when the original FAT which was created during the format operation of the data memory device (comprising nearly empty table at this stage) is modified, the details of this modification are stored as log entry. Subsequent modifications are stored similarly by generating corresponding chronological log entries. Upon the host's request, FAT is virtually generated by the controller which addresses the log entries when looking for the requested FAT entry. The FAT is hence a virtual entity and it is represented by the log entries which are located in the code region.

Figure 6:
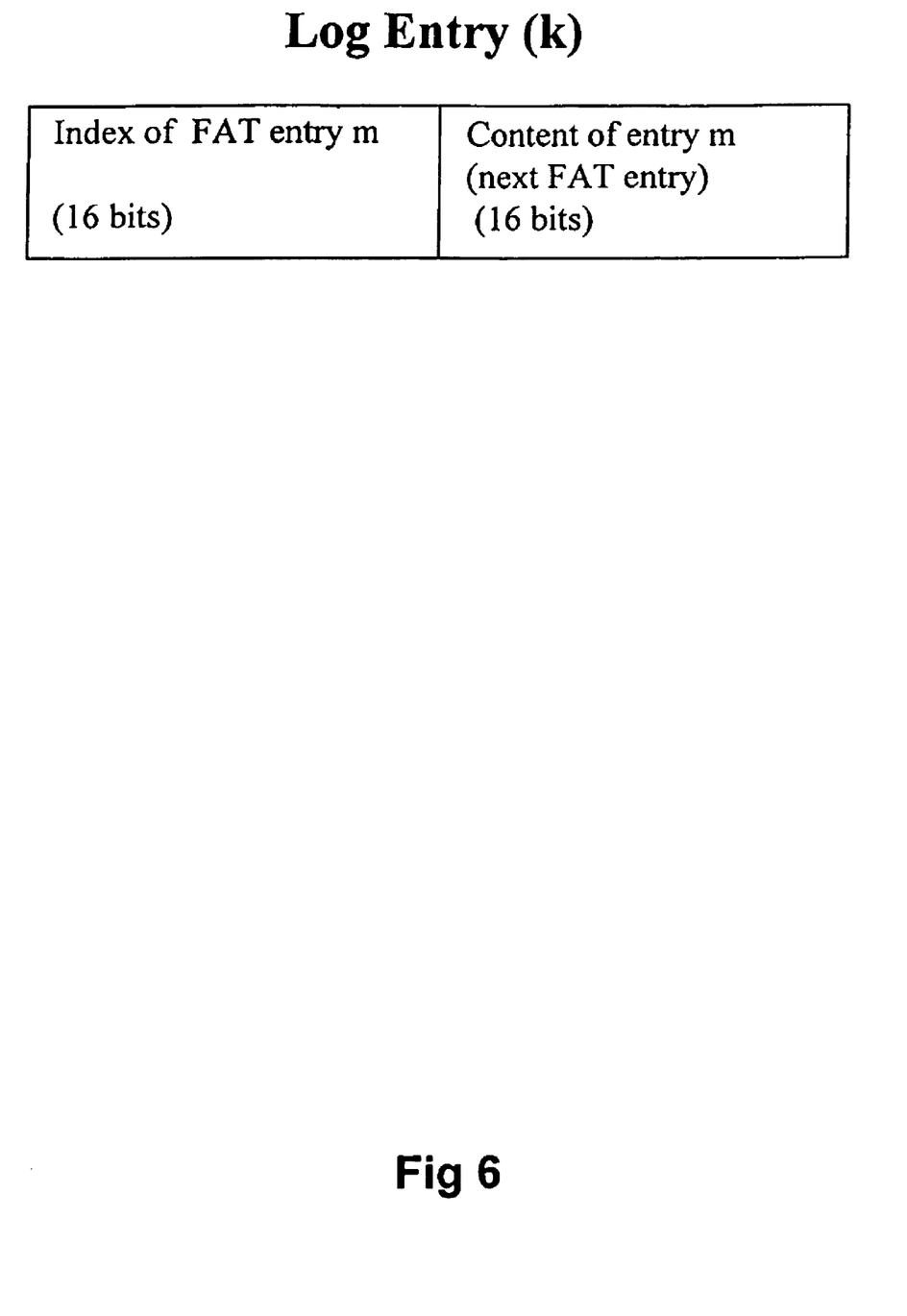
FIG. 6 schematically depicts the structure of an entry in a virtual file system file such as FAT, according to an exemplary embodiment of the current invention.

FIG. 6 schematically depicts the structure of an entry in a virtual file system file such as FAT, according to an exemplary embodiment of the current invention. According to this exemplary embodiment each log entry comprises an index part and a correction part which correspond to the entry index and entry content of the updated FAT. In this non limiting example, each of index part and correction part are 16 bits long. Optionally, correction part uses the standard FAT codes. E.g. codes for designating: empty block; the location of next block in the file; End Of File (EOF); etc.

In prior art when read operation commence, the host addresses the FAT entry where the first block of the requested file is pointed. The content of the first block (pointed out by the index) is fetched to the host while the content of the entry is used to allocate the next block. Similarly, the rest of the blocks that are contained in the requested file are sequentially pointed by other FAT entries. The content of these blocks is fetched to the host similarly as described above.

Figure 7:
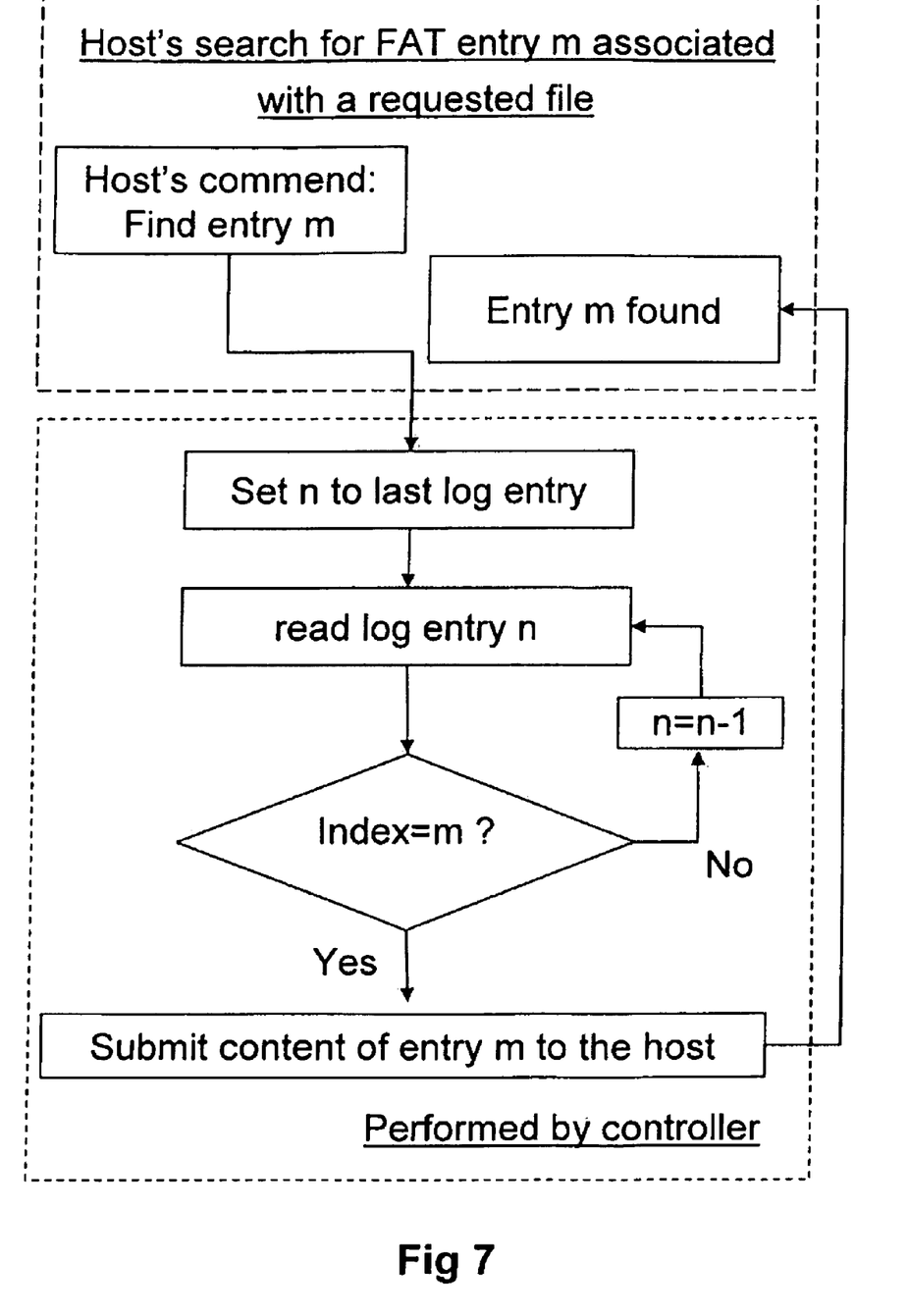
FIG. 7 schematically depicts the reverse inquiry for a file in response to the host's request, according to an exemplary embodiment of the current invention.

According to an exemplary embodiment of the current invention, as demonstrated in FIG. 7, following the host's (110) request for entry m in the FAT (which indicate on the location of certain block of the requested file), the controller 840 is looking for the last update of this entry in the log entry list by backward search, starting at the last log entry n and searching towards the first entry "1". When an entry containing index m is first encountered, the content of this entry is submitted to the host. The rest of the blocks associated with the required file are fetched to the host by the same sequence as described above.

According to the preferred embodiment of the invention, the search in the log entries file is performed by the controller 840 of card 820. The controller 840 searches the log entries file 850 and transfer to the host the last updated entry relevant to the file requested by the host 110. The host 110 accepts the last updated log entry as if it was taken from FAT although such FAT do not exist in the controller memory or in the memory card data.

Note that the above described method may not be necessary if the code region is with erase functionality, hence having multiple program and erase capability. Typically, erase operation of the memory array is not possible in OTP die. However, in NROM technology, applying the positive voltage bias, which is used during program operation, to the Bit-Line (BL) and keeping the Word-Lines (WL) grounded enable to realize erase functionality in the code region. By applying such a method, the memory cells in the code region can be programmed and erased.

It should be noted, that dual-memory 830, as depicted in FIG. 4, having erase capability in the code region 850 may be used in a standard applications where flash memories are used today without the need for excessive die area for management purpose and without relying on virtual FAT approach. For the user, the memory may behave as standard flash or disk device. Thus, data may be deleted and/or modified, however, if its data region 860 has no erase capabilities, once the data region 860 is fully written, logically deleting data does not free memory space and no new data may be written and data may not be changed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A non-volatile memory die comprising:
an array controller; and
a memory array comprised of: a code region having a first memory capacity and a first code region minimal accessible data size; and a data region having a second memory capacity and a second data region minimal accessible data size; wherein said second memory capacity is larger than said first memory capacity, and wherein said code region minimal accessible data size is shorter than said data region minimal accessible data size and wherein the code and data regions are formed concurrently and using same cell structure on the die, and wherein said array controller is configured to retrieve information from said code region and said data region.

2. The non-volatile memory die of claim 1 wherein the code and data regions are capable of being programmed once.

3. The non-volatile memory die of claim 1 wherein said cell structure is NROM structure.

4. The non-volatile memory die of claim 3 wherein said NROM cell comprises Oxide-Nitride-Oxide (ONO) stack dielectric used as charge trapping domain;
a symmetric array consisting of buried bit-lines and word-lines perpendicular to each other; and
a channel hot electron injection programming.

5. The non-volatile memory die of claim 3 wherein NROM cell density in said code region comprises 1 bit per cell.

6. The non-volatile memory dies of claim 3, wherein NROM cell density in said code region comprises 2 bit per cell.

7. The non-volatile memory dies of claim 3 wherein NROM cell density in said data region comprising at least 2 bit per cell.

8. The non-volatile memory dies of claim 7 wherein NROM cell density in said data region comprising at least 4 bit per cell.

9. The non-volatile memory die of claim 1 wherein said first code region minimal accessible data size is up to 64 bits.

10. The non-volatile memory die of claim 9 wherein said first code region minimal accessible data size is up to 16 bits.

11. The non-volatile memory die of claim 10 wherein said first code region minimal accessible data size is up to 8 bits.

12. The non-volatile memory die of claim 11 wherein said first code region minimal accessible data size is 1 bit.

13. The non-volatile memory die of claim 1 wherein said second data region minimal accessible data size is at least 512 bytes.

14. The non-volatile memory die of claim 1 wherein said first memory capacity is no more than 1% of said second memory capacity.

15. The non-volatile memory die of claim 1 wherein said first memory capacity is no more than 256K byte and said second memory capacity is at least 64 M byte.

16. The non-volatile memory die of claim 15 wherein said first memory capacity is no more than 256K byte and said second memory capacity is no more than 2 G byte.

17. A non-volatile memory die of claim 1 wherein said code region is capable of being programmed and erased and said data region is capable of being programmed only once.

18. A non-volatile memory die of claim 1 wherein the die is incorporated within a data storage device that comprises a host controller interfacing between a host and the non-volatile memory die.

19. A non-volatile memory die of claim 18 wherein said host controller and the non-volatile memory die are processed on different dies.

20. A non-volatile memory die of claim 18 wherein said host controller and the non-volatile memory die are processed on the same die.

* * * * *